(12) United States Patent
Hirano et al.

(10) Patent No.: US 6,184,979 B1
(45) Date of Patent: Feb. 6, 2001

(54) LASER REFERENCE LEVEL SETTING DEVICE

(75) Inventors: Satoshi Hirano; Fumio Ohtomo, both of Tokyo-to (JP)

(73) Assignee: Kabushiki Kaisha Topcon, Tokyo-to (JP)

(*) Notice: Under 35 U.S.C. 154(b), the term of this patent shall be extended for 0 days.

(21) Appl. No.: 08/902,228

(22) Filed: Jul. 29, 1997

(30) Foreign Application Priority Data

Aug. 6, 1996 (JP) ...................................................... 8-223224

(51) Int. Cl.[7] ...................................................... G01C 9/02
(52) U.S. Cl. ............................ 356/247; 356/138; 340/557
(58) Field of Search ........................... 356/247, 399–401, 356/139, 139.01–141.5, 138, 150, 152.1–152.3, 153; 33/227, 228, 285, 286, 290, 293, DIG. 21; 340/825.71–825.76, 500–516, 539, 555–557; 250/201.1, 201.6, 221

(56) References Cited

U.S. PATENT DOCUMENTS

| 5,337,846 | * | 8/1994 | Ogaki et al. . |
| 5,621,975 | * | 4/1997 | Rando . |
| 5,689,261 | * | 11/1997 | Mehta et al. . |
| 5,903,345 | * | 5/1999 | Butler et al. . |

* cited by examiner

Primary Examiner—Hoa Q. Pham
(74) Attorney, Agent, or Firm—Nields & Lemack (57) ABSTRACT

A laser irradiation unit for projecting a laser beam onto a target for reference comprises a remote receiving unit for receiving an operation light signal from a remote controller, a buzzer or a lamp for confirming operation, and a control unit for operating the buzzer for confirming operation or lighting up the lamp for confirming operation in case the operation light signal is received by the remote receiving unit, and the condition of the remote control operation is conveyed to an operator or the remote controller by sound of the buzzer for confirming operation or by lighting of the lamp for confirming operation.

5 Claims, 6 Drawing Sheets

REMOTE CONTROL SIGNAL

TUNING CIRCUIT 44

TUNING CIRCUIT 45

TUNING CIRCUIT 46

WAVEFORM SHAPING CIRCUIT 52

FIG. 8
(PRIOR ART)

LASER REFERENCE LEVEL SETTING DEVICE

BACKGROUND OF THE INVENTION

The present invention relates to a laser reference level setting device for setting a reference line in various types of civil engineering works.

In case of civil engineering works, it is necessary to have a horizontal reference line or a reference line tilted at a predetermined angle with respect to the horizontal line. A laser reference level setting device is used to set this reference line.

In case concrete pipes are buried in sewage construction, the pipes must be laid without bending and also must be tilted at a predetermined angle.

The concrete pipe of this type is used as a flow passage for city water, sewage water, and other liquid, and it is laid with a certain gradient and without bending. If the buried concrete pipes meander in horizontal or vertical directions, the water or other liquid stagnates or is stopped or leaked into soil, and the pipes no more fulfill the role as a flow passage. Therefore, to install the concrete pipes in a proper manner, it is necessary to have an adequate reference line.

As the reference line of this type, a laser beam is the most suitable because it does not slack like a thread even when it is used for a long distance, does not hinder installation and other operation, or is not cut off due to interference with the concrete pipe during the construction work. The laser reference level setting device as described above is used to form the reference line by projecting a laser beam when the concrete pipes are installed.

As a typical technique to bury concrete pipes underground, an open cut technique is known. In this technique, the ground is dug, and concrete pipes are laid and buried one after another in the ditch and are covered with soil.

Figure 8:
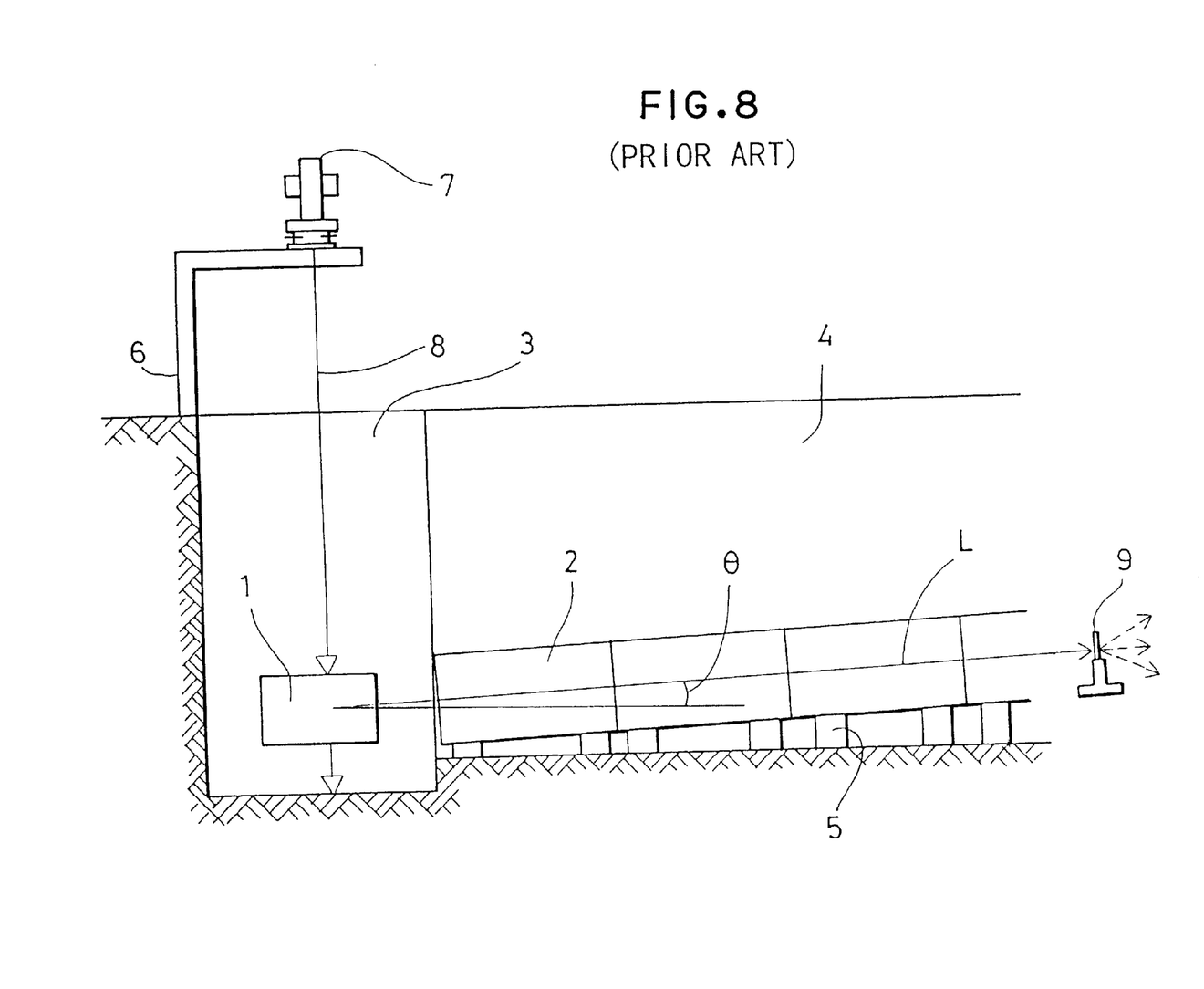
FIG. 8 is a drawing to explain the conventional open cut technique.

In the following, description will be given on the open cut technique referring to FIG. 8.

The laser reference level setting device comprises a laser irradiation unit 1 for projecting a laser beam in the horizontal direction or in a direction with a gradient, and a target 9. When the laser beam projected from the laser irradiation unit 1 is aligned with the horizontal line, a horizontal reference line is formed. When the laser beam is tilted at a predetermined angle, a reference line with a gradient is formed.

At regular interval along a linear section, a vertical pit 3 is excavated with a depth, which is deeper than the depth to install concrete pipes at each starting point to bury concrete pipes 2, and a burial ditch 4 continuous to the vertical pit 3 is dug to a depth deeper than the depth to bury the concrete pipes. The laser irradiation unit 1 is installed in the vertical pit 3, and a laser beam is projected at a gradient of θ, and a reference laser beam L is formed. The concrete pipes 2 are laid in the burial ditch 4 via a provisional base 5 so that the axis of the concrete pipes 2 is aligned with the reference laser beam L. When the axis of the concrete pipes 2 is aligned with the reference laser beam L, the burial ditch 4 is filled with soil, and the concrete pipes 2 are buried.

In the laser irradiation unit 1, its position in the horizontal direction must be accurately set. For the accurate positioning of the laser irradiation unit 1 in the horizontal direction, a support stand 6 is installed above the vertical pit 3, and a transit 7 is placed on the support stand 6. A plumb-bob is suspended from the transit 7, and a known point is set. Further, the laser irradiation unit 1 is installed in the vertical pit 3, and the plumb-bob is aligned with the center of the laser irradiation unit 1. Then, the plumb-bob is suspended from the laser irradiation unit 1, and the plumb-bob is aligned with the known point.

In the open cut method, the concrete pipe 2 is provisionally installed at a terminal end of the burial ditch 4, and a target 9 is placed in it. The distance from the center of the target to a point of the target touching the ground is equal to the inner radius of the concrete pipe 2. As a result, when the target is placed in the concrete pipe 2, the center of the target is aligned with the center of the concrete pipe 2.

A portion of the target 9 where a laser beam is projected i.e. a target plate, is made of semi-transparent material. Thus, it is possible to confirm a projecting position of the laser beam and the transmitted laser beam is diffused in conical form, and a projected position of the target 9 can be confirmed within the range of diffusion of the transmitted laser beam. To set tilting of the laser beam projected from the laser irradiation unit 1, a tilt setting angle is inputted to the laser irradiation unit 1. A tilting mechanism is incorporated in the laser irradiation unit 1. The tilting mechanism is operated to set the laser beam at a predetermined tilt angle.

The target 9 is at a position on the extension of the laser beam projected from the laser irradiation unit 1, and the projecting position of the laser beam is confirmed. In case the projected laser beam is deviated from the center of the target 9, the provisionally installed concrete pipe 2 or the laser beam is adjusted in the vertical direction for vertical adjustment. For the deviation in the lateral direction, a regulating device (not shown) of main unit of the system is manually operated or the concrete pipe is adjusted, so that the laser beam is aligned with the center of the target 9 while confirming the laser beam projecting position of the target 9 from the direction of the laser irradiation unit 1. The concrete pipes 2 are installed using the laser beam projected to the center of the target 9 as a reference line.

There are several methods to control the laser beam projected from the laser reference level setting device: to flash on and off the projecting laser beam, to perform auto alignment, i.e. to automatically project in the horizontal direction and align the laser beam with the center of the target, or to perform tilt setting, i.e. to tilt the direction of the laser beam. The control operations as described above can be performed from an operation panel provided on the laser reference level setting device. To facilitate the operation, remote control system is adopted. The projected light is visible light, but it is the laser beam with high directivity. It is difficult to visually confirm unless it is projected to an object with high diffusivity. It is difficult to visually confirm even at nighttime when there is rather high contrast from the surrounding. In daytime, it is much more difficult because of sunlight. Even when it is tried to set the direction of the projected laser beam by remote control operation, the operation cannot be confirmed until the result is known. For example, in case the laser reference level setting device is installed at a reference point and the laser beam is directed toward a target placed at a predetermined position in the first stage of the setting operation, it is difficult to confirm whether remote control operation is being achieved or not during the setting operation because a laser beam has high directivity and operation cannot be visually confirmed until the laser beam is projected and diffused.

SUMMARY OF THE INVENTION

It is an object of the present invention to provide a laser reference level setting device operated by remote control and it is possible by this system to confirm conditions of remote control operation when it is installed at a reference point and the setting operation such as the setting of laser projecting direction is performed.

To attain the above object, the laser reference level setting device according to the present invention is provided with a target and a laser irradiation unit for projecting a laser beam onto the target for reference, wherein said laser irradiation unit has a remote receiving unit for receiving an operation light signal from a remote controller, a buzzer for confirming the operation, and a control unit for driving the buzzer for confirming operation when the operation light signal is received by the remote receiving unit, whereby sound of the buzzer for confirming operation is changed according to the remote control operating condition and the buzzer for confirming operation is driven according to the condition of the laser irradiation unit.

Also, to attain the above object, the laser reference level setting device of the present invention is provided with a target and a laser irradiation unit for projecting a laser beam onto the target for reference, wherein said laser irradiation unit has a remote receiving unit for receiving an operation light signal from a remote controllers a lamp for confirming the operation and a control unit for lighting up the lamp for confirming operation when the operation light signal is received by the remote receiving unit, whereby the lamp for confirming operation is flashed on and off according to the remote control operating conditions.

DETAILED DESCRIPTION OF THE PREFERRED EMBODIMENT

In the following, description will be given on an embodiment of the present invention referring to the attached drawings.

Figure 1:
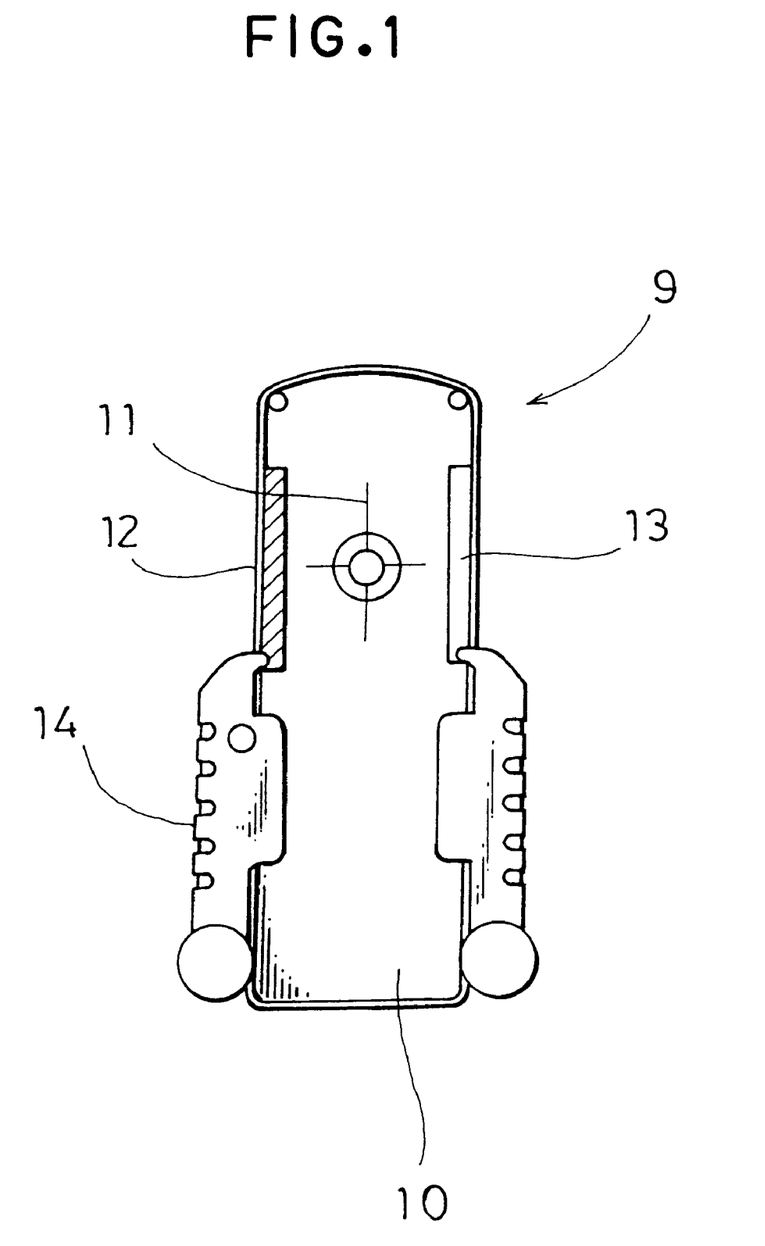
FIG. 1 is a drawing of a target to be used in an embodiment of the present invention.

First, a target 9 in the present embodiment will be described in connection with FIG. 1.

At the center of a target plate 10 designed in tall rectangular shape, a cross line 11 is marked. With the intersection of the cross line 11 as the center of symmetry, a left reflection plane 12 and a right reflection plane 13 are arranged at symmetrical positions. The left reflection plane 12 and the right reflection plane 13 have the same width at least in the horizontal direction. In case the two reflection planes 12 and 13 do not have the same width, the left reflection plane 12 and the right reflection plane 13 may be designed in symmetrical shape with respect to a vertical line or a horizontal line of the cross.

The left reflection plane 12 is designed in such a manner that a retroreflection layer comprising small spheres or small prisms is attached on the target plate 10, and a ¼λ birefringence member is attached on the retroreflection layer. It is a polarization converting reflection plane to reflect the incident laser beam by converting the direction of polarization. The right reflection plane 13 is designed in such a manner that a retroreflection layer comprising small spheres or small prisms are attached on the target plate 10, and it is a polarization maintaining reflection plane, which reflects the incident laser beam while maintaining the direction of polarization. The target plate 10 is erected in a perpendicular direction to a plane of installation using a target plate stand 14.

When a laser beam is projected to scan across the target 9, the laser beam reflected by the left reflection plane 12 has a direction of polarization different from that of the laser beam reflected by the right reflection plane 13. By splitting the reflected laser beam at a photodetection unit of the reflected laser beam and by receiving two reflected laser beams thus split via polarizing plates having different directions of polarization, it is possible to judge whether the reflected laser beam entering the photodetection unit has been reflected by the left reflection plane 12 or by the right reflection plane 13. From the photodetecting condition at the photodetection unit, it is possible to determine the scanning direction of the laser beam and to obtain the center of the target 9.

Figure 2:
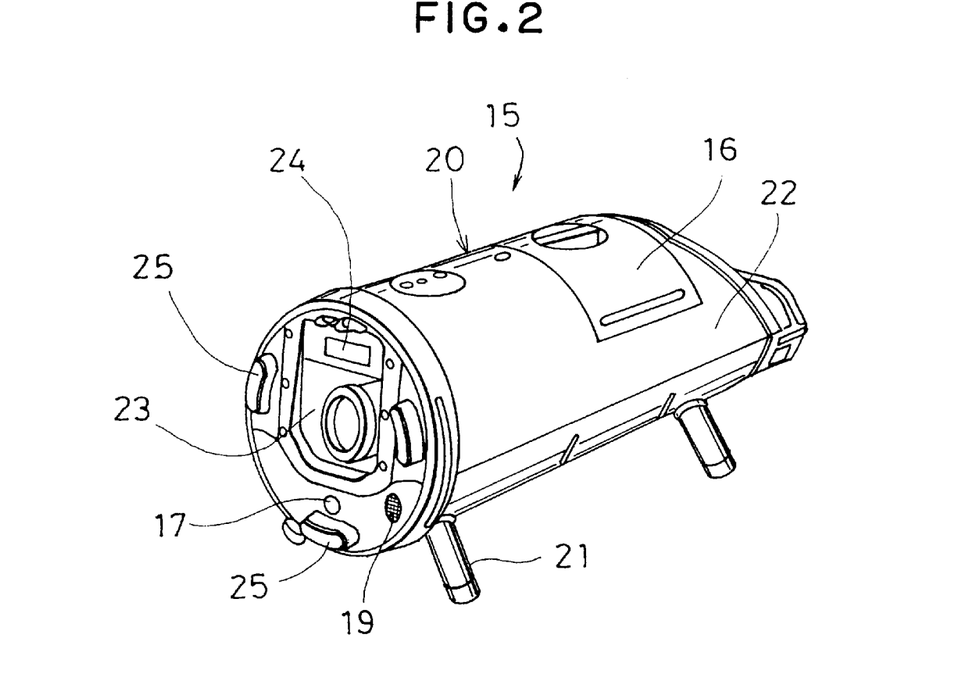
FIG. 2 is a perspective view seen from the front side of a laser irradiation unit used in the embodiment of the present invention.
Figure 3:
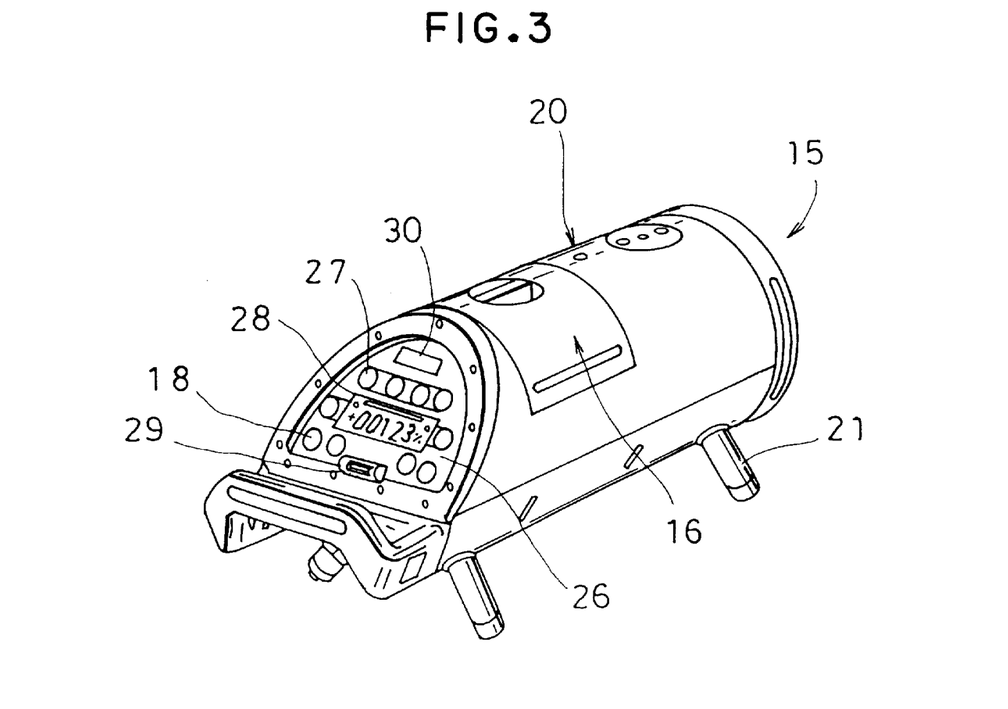
FIG. 3 is a perspective view seen from the back side of the laser irradiation unit used in the embodiment of the present invention.

Next, description will be given on the laser irradiation unit 15 referring to FIGS. 2 and 3.

A main unit 20 is designed in cylindrical shape and is supported by four support legs 21. In the main unit 20, a laser oscillator (not shown) is provided within a housing 22 so that it can be moved in vertical and horizontal directions. The laser oscillator is designed to project laser beams in horizontal and vertical directions.

On the front surface of the main unit 20, a light projection window 23 covered with glass is arranged, and a laser beam directed in the horizontal direction from the laser oscillator is projected through the light projection window 23.

A photodetection window 24 is provided above the light projection window 23, and a laser beam reflected from the target 9 is received through the photodetection window 24, or operation signal light for remote controller is received.

On the front surface of the main unit 20, there are provided a lamp 17 for confirming operation and a buzzer 19 for confirming operation. On the front surface of the main unit 20, a front leg 25 is provided, and the laser irradiation unit 15 can be erected in the vertical direction using the front leg 25. On the rear side of the top surface of the housing 22, a battery pack 16 is removably provided.

The rear surface of the main unit 20 is inclined, and the inclined surface also serves as an operation panel 26. On the operation panel 26, various types of operation switches 27 are arranged, and there are further provided a lamp 18 for confirming operation, a display unit 28, a bubble tube 29 and a photodetection window 30, which receives a remote control operation signal in the same manner as the photodetection window 24. Because the photodetection window 30 is provided on the inclined operation panel 26, it can be remotely controlled from horizontal or vertical directions by a remote controller. Thus, it is possible to remote control the laser irradiation unit 15 installed underground from outside the vertical pit. Because the display unit 28 is arranged on the inclined operation panel 26, the content of display can be confirmed from above.

Figure 4:
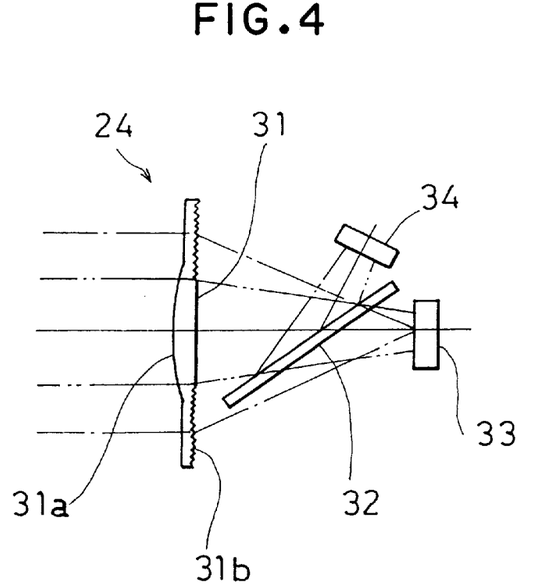
FIG. 4 is a side view to explain a photodetection window of a projection optical system of the above embodiment.
Figure 5:
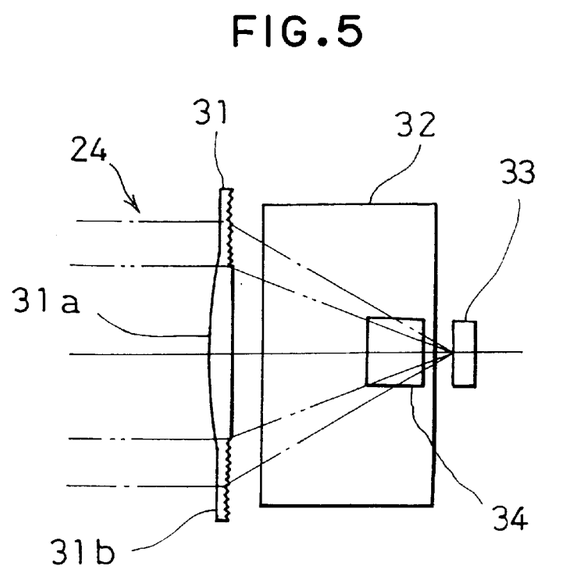
FIG. 5 is a plan view to explain the photodetection window of a projection optical system of the above embodiment.

Next, description will be given on the photodetection window 24 referring to FIG. 4 and FIG. 5. In the photodetection window 24 described below, the photodetection unit to receive a reflected laser beam, i.e. a reflection laser beam detector, has an optical system split into a first photodetector 33 and a second photodetector 34.

The photodetection window 24 is arranged in such a manner that the reflection light beam from the target 9 and the remote control signal light beam enter there. The light beams entering through the photodetection window 24 are detected by a light detection circuit 40 and these light beams are discriminated from each other.

A photodetection lens 31 is arranged on the photodetection window 24. The central portion of the photodetection lens 31 is a toric lens portion 31a, which has different magnification factors in two directions, which run perpendicularly to optical axis, and the peripheral portion of the photodetection lens 31 is designed as a Fresnel lens portion 31b. The light entering through the photodetection lens 31 is split by a polarizing mirror 32, and the transmitted laser beam enters the first photodetector 33, the reflected laser beam enters the second photodetector 34, and photodetection signal is outputted to a control unit 60 (to be described later).

The reflected laser beam coming from the target 9 is concentrated by the toric lens portion 31a, and the remote operation signal light beam for remote control of the system is concentrated by the Fresnel lens portion 31b. The Fresnel lens portion 31b is equipped with a filter which allows the light beam with a specific wavelength to pass. Accordingly, the remote operation signal light beam passes through the Fresnel lens portion 31b and the toric lens portion 31a, while the reflected laser beam passes through the toric lens portion 31a only.

The polarizing mirror 32 allows only the polarized light in a predetermined direction to pass. For example, the reflected laser beam maintaining the initial direction of polarization passes through it, while the reflection laser beam with converted direction of polarization is reflected by it. However, the polarizing mirror 32 cannot be used as a polarizing mirror when it exceeds the limited incident angle. The toric lens portion 31a is a condenser lens by taking this property of the polarizing mirror into consideration. Light beams are not converged very much in the vertical direction, in which the polarizing mirror 32 is inclined, and light beams are converged in the horizontal direction because the limited angle is not exceeded.

There is no need to select the remote operation signal light beams by the polarizing mirror 32. Therefore, they have a wavelength different from that of the reflected laser beams and passe through the polarizing mirror 32 and are converged, while a part of them is reflected. When the remote operation signal light beam is received, output signals of the photodetectors 33 and 34 are added, and operation of the main unit is controlled according to the added signals. When the reflected laser beam is received, the reflected laser beam is split as described above, and the reflected laser beams thus split are received by two photodetectors 33 and 34. The difference between output signals of the two photodetectors 33 and 34 is calculated, and the center of the target is calculated. Based on this signal, operation of the main unit is controlled.

Figure 6:
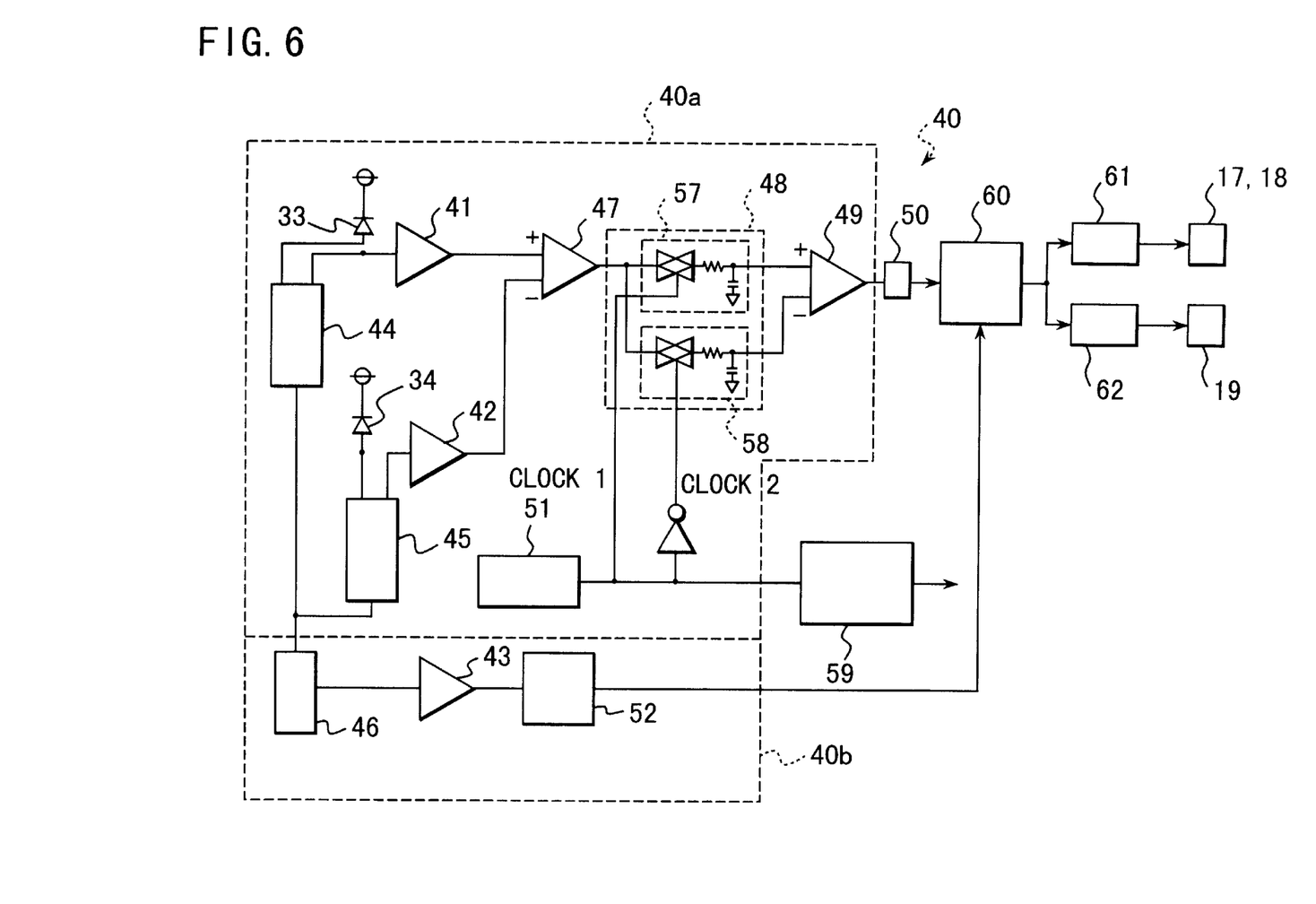
FIG. 6 is a circuit diagram of a light detection circuit in the above embodiment.

On the operation signal light beam for laser beam remote control received through the photodetection window 24, signal processing as required is performed by the light detection circuit 40. The light detection circuit 40 comprises a reflected laser light detection circuit 40a and a remote control light signal detection circuit 40b.

Description will be given now on the reflection laser light detection circuit 40a and the remote control light signal detection circuit 40b referring to FIG. 6. The light detection circuit 40 comprises a first amplifier 41, a second amplifier 42, a third amplifier 43, a first tuning circuit 44, a second tuning circuit 45, a third tuning circuit 46, a first differential amplifying unit 47, a synchronous detector 48, a second differential amplifying unit 49, a level discriminator 50, an oscillator 51, and a waveform shaping circuit 52.

The first tuning circuit 44 and the second tuning circuit 45 have the same tuning frequency, while the third tuning circuit 46 has a different tuning frequency.

The first amplifier 41 amplifies output signal of the first photodetector 33 via the first tuning circuit 44, and the second amplifier 42 amplifies output signal of the second photodetector 34 via the second tuning circuit 45.

The reflection light beam from the target 9 is selected and directed to the first photodetector 33 and the second photodetector 34 according to the direction of polarization. By detecting the ratio of the reflection light beams, the central position of the target 9 can be obtained.

The reflection laser beam from the target 9 is received by the first photodetector 33 and the second photodetector 34 and signals from the first photodetector 33 and the second photodetector 34 are amplified by the first amplifier 41 and the second amplifier 42 and are then inputted to the first differential amplifying unit 47. The first differential amplifying unit 47 is designed to obtain the difference of signals between the first amplifier 41 and the second amplifier 42.

The synchronous detector 48 comprises a first synchronous detector 57 and the second synchronous detector 58. By a clock 1 generated by the oscillator 51 and a clock 2 of its reverse signal, the synchronous detector 48 generates positive or negative voltage according to the output signal of the first differential amplifying unit 47.

It is designed that the second differential amplifying unit 49 obtains a signal of the difference between the first synchronous detector 57 and the second synchronous detector 58 of the synchronous detector 48, and positive or negative voltage is obtained to a bias signal. Output signal of the second differential amplifying unit 49 is inputted to the control unit 60 after the level is judged by the level discriminator 50. The control unit 60 detects position of the target 9 according to the signal from the level discriminator 50.

The oscillator 51 supplies a clock signal necessary for sychronous detection to the synchronous detector 48, and it also supplies a clock signal, which is sent to a laser driving unit 59 and pulses and drives the laser light source of the laser oscillator (not shown) of the laser irradiation unit 15.

The first photodetector 33 and the second photodetector 34 of the light detection circuit 40 are not only used for detection of the reflection light but also for detection of the light signal coming from the remote controller.

The light signal from the remote controller is received by the first photodetector 33 and the second photodetector 34. Output signals of the first photodetector 33 and the second photodetector 34 are summed up in the third tuning circuit 46, and after being amplified by the third amplifier 43, it is inputted to the control unit 60 via the waveform shaping circuit 52.

Figure 7:
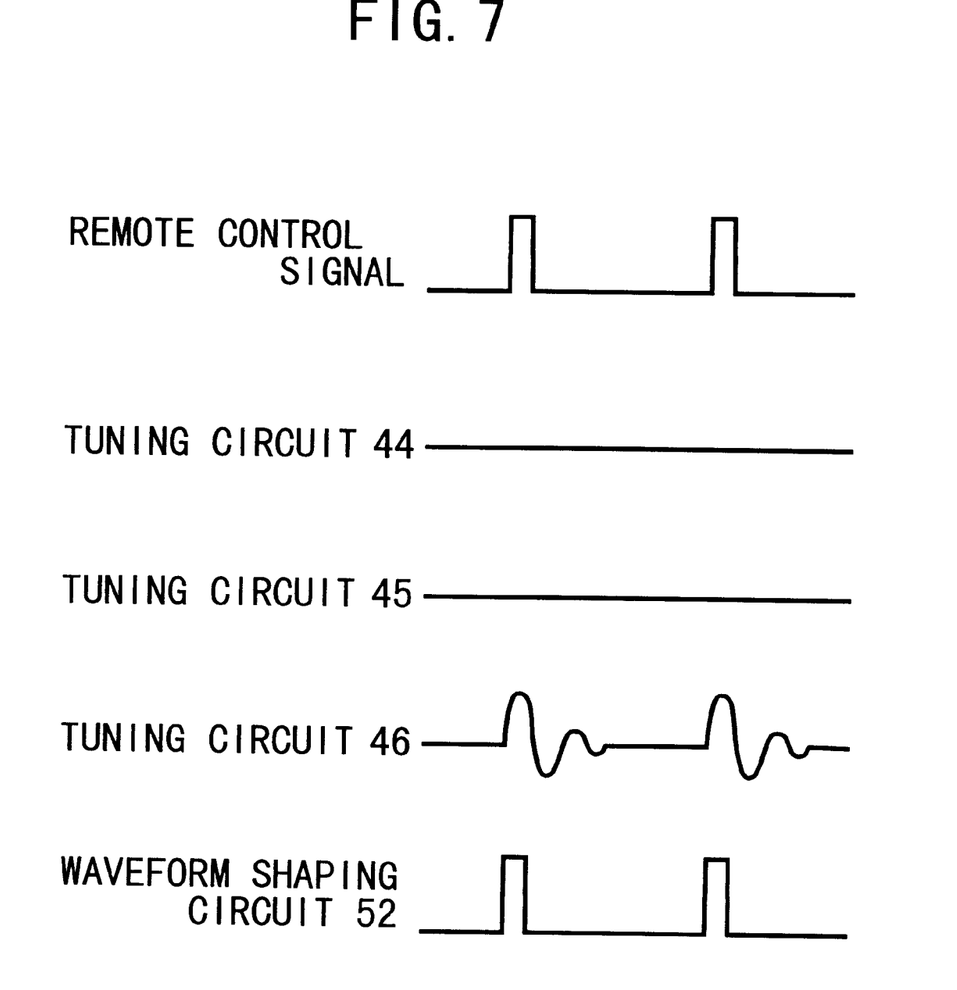
FIG. 7 represents line drawings to show waveforms of remote control signal in the light detection circuit and waveform in signal processing.

The light signal for remote control is pulsed as shown in FIG. 7, and it is designed in such a manner that the pulse width does not exert influence on the first tuning circuit 44 and the second tuning circuit 45. Specifically, it is designed that the duration twice as long as the pulse width of the remote controller is not consistent with the tuning frequency of the first tuning circuit 44 and the second tuning circuit 45.

For this reason, no output signal appears in the first tuning circuit 44 and the second tuning circuit 45. However, the third tuning circuit 46 is tuned with the frequency having a cycle twice as long as the pulse width of the remote controller, and when the light signal for remote control enters, damped oscillation waveform appears from the third tuning circuit 46. If the damped oscillation waveform from the third tuning circuit 46 is shaped by the waveform shaping circuit 52 via the third amplifier 43, control signal can be generated. The control signal is inputted to the control unit 60, and the control unit 60 lights up the lamps 17 and 18 for confirming operation via a driver 61 or prompts the buzzer 19 for confirming operation to issue sound via a driver 62.

In general, sound attenuates and diffuses very much and is difficult to reach a remote site. The present laser reference level setting device is used in a closed space such as concrete pipe, and attenuation and diffusion of sound are suppressed. Therefore, even low sound can reach a place at a distance of about 100 meters, and the operator of the remote controller can confirm buzzer sound well. Also, by confirming buzzer sound and lighting of the lamps 17 and 18, it is possible to confirm that operation is carried out in perfect manner. The confirmation of operation by the lamps 17 and 18 is effective for the work in an open space as in the open cut technique. In case the system is used in a closed space such as concrete pipe, because of the reason described above the conditions can be easily confirmed visually, and the lamps 17 and 18 may be of small capacity. This means lower power consumption and lower cost.

Buzzer sound may be changed or turned on and off intermittently or the lamp may be lighted up according to the operating condition. For example, it may be designed in such a manner that frequency of sound may be increased or interval of lighting of the lamp may be reduced as the laser beam approaches the target center. Further, the conditions of the laser irradiation unit itself can be identified by the buzzer for confirming operation. For example, buzzer sound may be issued when capacity of the battery is being expired.

As described above, it is possible according to the present invention to confirm the operating condition when the laser irradiation unit is controlled by a remote controller, and this contributes to improvement of working efficiency and perfect operation in a laser reference level setting device using laser beam, which has high directivity.

What we claim are:

1. A laser irradiation device, which projects a reference laser beam onto a target for reference to set pipes, and whose direction is able to be controlled by using an operation light from a remote controller having an output, said irradiation device having a front surface and comprising a remote receiving unit for receiving an operation light from said remote controller and detecting an operation light signal from said received light, a buzzer responsive to said output for confirming operation, and a control unit for sounding said buzzer to confirm the operation of said remote controller based on the detected operation light signals wherein said remote receiving unit and said buzzer for confirming operation are provided on said front surface of said laser irradiating device for emitting said reference laser beam.

2. A laser irradiation device according to claim 1, wherein sound of the buzzer for confirming operation is changed according to the output of the remote controller.

3. A laser irradiation device according to claim 1, wherein said laser irradiation unit exhibits operating conditions, and wherein the buzzer for confirming operation is driven according to said operating conditions of the laser irradiation unit.

4. A laser irradiation device, which projects a reference laser beam onto a target for reference to set pipes, and whose direction is able to be controlled by using an operation light from a remote controller having an output, said irradiation device having a front surface and comprising a remote receiving unit for receiving an operation light from said remote controller and detecting an operation light signal from said received light signal, a lamp responsive to said output for confirming operation, and a control unit for lighting said lamp to confirm the operation of said remote controller based on the detected operating light signal, wherein said remote receiving unit and said lamp for confirming operation are provided on said front surface of said laser irradiating device for emitting said reference laser beam.

5. A laser irradiation device according to claim 1, wherein the lamp for confirming operation is flashed on and off according to the output of the remote controller.

* * * * *